US008299905B2

(12) United States Patent
King

(10) Patent No.: US 8,299,905 B2
(45) Date of Patent: Oct. 30, 2012

(54) SYSTEM FOR APPLYING TACTILE STIMULATION TO THE CONTROLLER OF UNMANNED VEHICLES

(76) Inventor: Quentin King, Concord West (AU)

( * ) Notice: Subject to any disclaimer, the term of this patent is extended or adjusted under 35 U.S.C. 154(b) by 0 days.

(21) Appl. No.: 12/421,354

(22) Filed: Apr. 9, 2009

(65) Prior Publication Data
US 2009/0289778 A1  Nov. 26, 2009

Related U.S. Application Data

(63) Continuation-in-part of application No. 11/852,860, filed on Sep. 10, 2007, now Pat. No. 7,764,166, which is a continuation of application No. 10/510,381, filed on Feb. 10, 2005, now Pat. No. 7,268,672.

(51) Int. Cl.
*H04B 3/36* (2006.01)
(52) U.S. Cl. .......... 340/407.1; 340/407.2; 340/7.6; 340/539.11; 340/539.12
(58) Field of Classification Search .......... 340/407.1, 340/7.6, 539.11, 539.12, 539.13, 539.17, 340/407.2; 701/2; 715/702, 701; 434/113, 434/114; 341/27; 414/5
See application file for complete search history.

(56) References Cited

U.S. PATENT DOCUMENTS

| | | | | |
|---|---|---|---|---|
| 4,635,035 A | * | 1/1987 | Ratzabi | 340/426.28 |
| 5,285,685 A | * | 2/1994 | Chelette | 73/432.1 |
| 5,651,070 A | * | 7/1997 | Blunt | 381/56 |
| 5,825,283 A | * | 10/1998 | Camhi | 340/438 |
| 6,087,942 A | * | 7/2000 | Sleichter et al. | 340/576 |
| 6,218,958 B1 | * | 4/2001 | Eichstaedt et al. | 340/7.6 |
| 6,232,887 B1 | * | 5/2001 | Carson | 340/903 |
| 6,744,370 B1 | * | 6/2004 | Sleichter et al. | 340/576 |
| 6,771,167 B1 | * | 8/2004 | Flick | 340/426.21 |
| 6,836,982 B1 | * | 1/2005 | Augustine | 37/348 |
| 6,850,150 B1 | | 2/2005 | Ronkainen | |

(Continued)

FOREIGN PATENT DOCUMENTS
CA   2159439   4/1996
(Continued)

OTHER PUBLICATIONS

International Search Report for International Application No. PCT/AU03/00407 mailed Jun. 19, 2003 (3 pages).

(Continued)

*Primary Examiner* — Hoi Lau
(74) *Attorney, Agent, or Firm* — Dicke, Billig & Czaja, PLLC

(57) ABSTRACT

A system 1 for applying tactile stimulation to the controller of a remote vehicle. The system 1 includes one or more sensors 2 disposed on the remote vehicle and configured to measure a physical property of the remote vehicle and generate output data indicative thereof. A transmitter 3 is disposed in the remote vehicle and is in communication with the sensor(s) 2 to receive the output data where the transmitter 3 is configured to send the output data to the controller at a remote location. The system 1 further includes a tactile stimulator 4 configured to be placed in directly or indirectly in contact with a skin surface of the controller of the remote vehicle to whom an output of the tactile stimulation is to be provided. The tactile stimulator 4 is in communication with the output of the sensor 2 to deliver tactile stimulation corresponding to the magnitude of the sensed physical property.

16 Claims, 14 Drawing Sheets

U.S. PATENT DOCUMENTS

| | | | |
|---|---|---|---|
| 6,930,590 B2 * | 8/2005 | Ling et al. | 340/407.1 |
| 7,068,163 B2 * | 6/2006 | Sari et al. | 340/539.13 |
| 7,084,854 B1 * | 8/2006 | Moore et al. | 345/157 |
| 7,173,881 B1 | 2/2007 | Freudenberg, Jr. et al. | |
| 7,182,691 B1 * | 2/2007 | Schena | 463/38 |
| 7,248,150 B2 * | 7/2007 | Mackjust et al. | 340/426.13 |
| 7,268,672 B2 | 9/2007 | King | |
| 7,394,405 B2 * | 7/2008 | Godden | 340/996 |
| 7,414,520 B2 | 8/2008 | Meißner | |
| 7,602,278 B2 | 10/2009 | Prost-Fin et al. | |
| 7,764,166 B2 | 7/2010 | King | |
| 8,063,754 B2 * | 11/2011 | Tanida et al. | 340/435 |
| 8,065,054 B2 * | 11/2011 | Tarasinski et al. | 701/37 |
| 2001/0035811 A1 * | 11/2001 | Dewan | 340/5.25 |
| 2001/0045978 A1 * | 11/2001 | McConnell et al. | 348/42 |
| 2002/0087262 A1 * | 7/2002 | Bullock et al. | 701/202 |
| 2002/0145512 A1 * | 10/2002 | Sleichter et al. | 340/407.1 |
| 2003/0189493 A1 | 10/2003 | Klausner et al. | |
| 2003/0227374 A1 * | 12/2003 | Ling et al. | 340/407.1 |
| 2004/0049323 A1 | 3/2004 | Tijerina et al. | |
| 2004/0178908 A1 * | 9/2004 | Sari et al. | 340/539.32 |
| 2004/0239491 A1 * | 12/2004 | Koutsky et al. | 340/438 |
| 2005/0021204 A1 | 1/2005 | Kudo | |
| 2005/0046560 A1 * | 3/2005 | Stigall | 340/456 |
| 2005/0046562 A1 * | 3/2005 | Stigall | 340/463 |
| 2005/0132290 A1 * | 6/2005 | Buchner et al. | 715/702 |
| 2006/0071766 A1 * | 4/2006 | O'Brien et al. | 340/442 |
| 2006/0097857 A1 * | 5/2006 | Osaka et al. | 340/435 |
| 2006/0134586 A1 * | 6/2006 | Armingaud et al. | 434/113 |
| 2006/0220806 A1 * | 10/2006 | Nguyen | 340/426.36 |
| 2007/0063834 A1 * | 3/2007 | Bozzone et al. | 340/539.1 |
| 2007/0109104 A1 | 5/2007 | Altan et al. | |
| 2007/0139167 A1 * | 6/2007 | Gilson et al. | 340/407.1 |
| 2007/0167105 A1 * | 7/2007 | Lorelli et al. | 446/6 |
| 2007/0247319 A1 * | 10/2007 | Oelrich et al. | 340/573.1 |
| 2008/0061954 A1 | 3/2008 | Kulas | |
| 2008/0103639 A1 * | 5/2008 | Troy et al. | 701/2 |
| 2008/0169929 A1 * | 7/2008 | Albertson et al. | 340/573.1 |
| 2008/0174415 A1 * | 7/2008 | Tanida et al. | 340/438 |
| 2009/0051519 A1 * | 2/2009 | Flick | 340/441 |
| 2009/0212974 A1 | 8/2009 | Chiba et al. | |
| 2009/0224876 A1 * | 9/2009 | McCall et al. | 340/5.61 |

FOREIGN PATENT DOCUMENTS

| | | |
|---|---|---|
| EP | 1100060 | 5/2001 |
| EP | 1698538 | 10/2008 |
| JP | 8161680 | 6/1996 |
| WO | 9418652 | 8/1994 |
| WO | 9716035 | 5/1997 |
| WO | 0120368 | 3/2001 |
| WO | 03088172 | 10/2003 |

OTHER PUBLICATIONS

International Preliminary Examination Report for International Application No. PCT/AU2003/000407 Date of Completion of the Report Jul. 6, 2004 (6 pages).

Search Report for Application No. GB1005929.3 Date of Search Jul. 7, 2010 (2 pages).

The Office Action for U.S. Appl. No. 10/510,381 mailed Oct. 24, 2006 (8 pages).

The Notice of Allowance for U.S. Appl. No. 10/510,381 mailed May 23, 2007 (4 pages).

The Office Action for U.S. Appl. No. 11/852,860 mailed Sep. 16, 2009 (15 pages).

The Notice of Allowance for U.S. Appl. No. 11/852,860 mailed Mar. 19, 2010 (9 pages).

* cited by examiner

SYSTEM FOR APPLYING TACTILE STIMULATION TO THE CONTROLLER OF UNMANNED VEHICLES

CROSS-REFERENCE TO RELATED APPLICATIONS

This application is a continuation-in-part of U.S. patent application Ser. No. 11/852,860, filed Sept. 10, 2007 now U.S. Pat. No. 7,764,166, which is a continuation of U.S. patent application Ser. No. 10/510,381, filed Feb. 10, 2005, now U.S. Pat. No. 7,268,672. Each of the aforementioned related patent applications are herein incorporated by reference in their entireties.

FIELD OF THE INVENTION

One aspect relates to control of remote vehicles and, in particular, to a system for providing tactile stimulation to the controller of a remote vehicle.

One aspect has been developed primarily to assist the pilots of remote controlled aircraft and will be described hereinafter with reference to this application. However, it will be appreciated that the invention is not limited to providing tactile stimulation to the controller of remote aircraft and is applicable to other remotely controlled terrestrial, sub-terrestrial, marine and submarine vehicles.

BACKGROUND

Military services, in particular in the United States, are increasingly relying on remotely controlled vehicles to conduct surveillance, gain scientific information or mount military attacks. The most distinguished example of remote controlled vehicles is aircraft known as unmanned aerial vehicles (UAVs) or colloquially as drones. The UAVs are configured to be piloted remotely and send back information, for example, surveillance images, to a remote location. A person at the remote location is in control of the UAV aircraft, effectively being the pilot from a remote distance.

The remote pilot is typically in a command or control room and receives telemetry from the UAV aircraft including pictures and aircraft data such as aircraft orientation and ground speed. The use of a remotely controlled aircraft removes the exposure of the pilot when flying over hostile or difficult territory, conducting surveillance or other military activities.

While it has been known for a relatively long period that remotely piloted aircraft can be used for surveillance or reconnaissance purposes, recently the remote controlled aircraft have been equipped with collision avoidance systems and targeted weapons systems such as laser guided precision weapons for use against identified enemy targets or combatants. The UAVs may also be used to deploy mines, buoys or torpedos, for example. The use of the UAV remote aircraft in a hostile or combat situation may require the aircraft to be maneuvered to avoid itself being targeted or to properly align on a moving target.

Not only is the advantage of not providing a pilot with an aircraft apparent, for example, where a pilot over hostile territory is difficult to extract if the aircraft fails, but the relative level of fitness and other skills of the remotely disposed pilot are at lower levels. For example, the physical abilities of a pilot to withstand high G forces is not a requirement for a remote control pilot who does not experience the forces of the remote aircraft but receives telemetry data indicative of them. The crash rates for the remote control aircraft are relatively high and this appears in part due to the nature of the telemetry or feedback the pilot receives. For example, properties such as the differential shear forces across different parts of the vehicle and thus the torque being applied when the vehicle is loaded with ordinance and the changes during and after release of the ordinance are not available to the remote pilot as input for their action.

According to the US military and private defense companies, a principle cause of UAV crashes is pilot error. The remote pilot, for example, does not feel wind shear or loss of lift events but only receives information indicative of, say, the altitude of the remote aircraft from telemetry data. If the remote pilot is not focussing on the changes of particular variables from the telemetry, it can be difficult for the remote pilot to appreciate the circumstance of the aircraft and avoid it from performing undesirably or crashing.

GENESIS OF THE INVENTION

The genesis of the present invention is a desire to provide a system for providing tactile stimulation to the controller of a remote vehicle that will overcome or substantially ameliorate one or more of the disadvantages of the prior art, or to provide a useful alternative.

SUMMARY

According to an aspect of the invention there is provided a system for applying tactile stimulation to the controller of a remote vehicle, the system comprising:

a sensor disposed on the remote vehicle and configured to measure a physical property of the remote vehicle and generate output data indicative thereof;

a transmitter associated with the remote vehicle and in communication with the sensor to receive the output data, the transmitter configured to send the output data to the controller at a remote location; and a tactile stimulator configured to be placed in direct or indirect contact with a skin or epidermal surface of the controller of the remote vehicle to whom an output of the tactile stimulation is to be provided, the tactile stimulator in communication with the output of the sensor to deliver tactile stimulation corresponding to the magnitude of the sensed physical property.

It can therefore be seen that there is advantageously provided a tactile stimulation system which is capable of delivering tactile stimulation to the pilot of a remote vehicle to provide them with a 'feel' for predetermined physical properties experienced by the remote aircraft. Advantageously, the controller of the remote vehicle can 'feel' the changes in physical properties of the remote aircraft or in response to those properties exceeding predetermined ranges. In this way, the controller of the remote vehicle can have their attention drawn to an aspect of the remote vehicle without needing to observe or consciously think about the telemetry data. The system becomes intuitive.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

Embodiments of the invention will now be described, by way of example only, with reference to the accompanying drawings in which.

DETAILED DESCRIPTION

Figure 1:
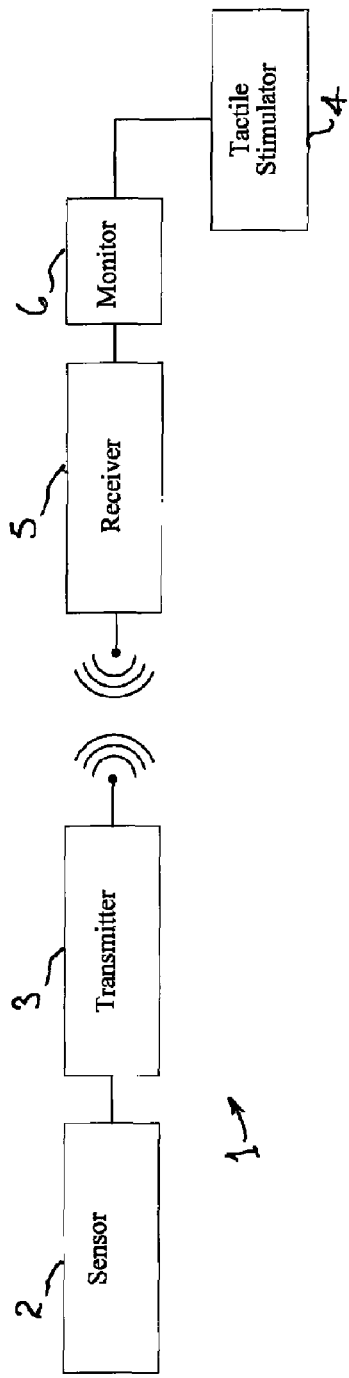
FIG. 1 is a schematic representation of the system for applying tactile stimulation according to a first embodiment.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Referring to the drawings generally, it will be appreciated that like reference numerals are used throughout the specification in connection with any of the accompanying drawings to denote like components. Throughout this specification, it will be appreciated that the terms skin, skin surface and the like are described with reference to epithelial skin surfaces but are applicable to ectodermal surfaces in general and may include mesothelial, mesodermal, endothelial or endodermal surfaces.

Referring to FIG. 1, there is illustrated a system 1 for applying tactile stimulation to the controller (not illustrated) of a remote vehicle in the form of an unmanned aerial vehicle (UAV) (not illustrated) according to first embodiment. The system 1 includes a sensor 2 disposed on the UAV and configured to measure a physical property of the UAV of interest to the controller disposed remotely from the vehicle. The sensor 2 is configured to generate output data indicative of a value of the corresponding measured physical property.

A transmitter 3 is also disposed on the UAV and is in communication with sensor 2 to receive the output data. The transmitter 3 is configured to send the output data received from the sensor 2 to the controller of the UAV at the remote location.

The system 1 further includes a tactile stimulator 4 configured to be placed in contact with a skin surface, directly or indirectly through clothing, for example, of the controller (not illustrated) of the UAV to whom an output, tactile stimulation, of the tactile stimulator 4 is to be provided. The tactile stimulator 4 is in communication with a receiver 5 and configured to receive signals transmitted by the transmitter 3, the signals being indicative of the output data provided by the sensor 2. The stimulator 4 is preferably in wireless communication with the receiver 5, however any suitable communication means can be chosen. For example, the receiver 5 and stimulator 3 may be connected by cable and each may be configured to simplify maintenance, repair or replacement of any of these components.

The tactile stimulator 4 is configured to deliver tactile stimulation corresponding to the magnitude of the sensed physical property to the controller of the UAV. In the embodiment of FIG. 1, the output of the sensor 2 is converted into data communicable to the controller of the remote vehicle by the transmitter 3 after being interpreted and/or manipulated at the remote location of the controller by a receiver monitor 6. It will be appreciated that the transmitter 3 disposed on the UAV can be replaced with a transceiver (not illustrated) to receive communications from the controller of the UAV.

The tactile stimulation applied to the remote vehicle controller is in the form of vibrational stimulation having a predetermined frequency and intensity that each may or not be constant but is indicative of or in correspondence with the magnitude of the physical property measured by the sensor 2. It will be appreciated that in other embodiments of the invention, not illustrated, the tactile stimulation could be hot or cold sensations, electrical stimulation, pressure stimulation, pain stimulation by means of application of an irritant or some other form of tactile stimulation.

The tactile stimulator 4 is configured to be connected to a body part of the controller (not illustrated). The stimulator 4 may be connected directly to the skin of the controller or indirectly connected or coupled to the skin through clothing or other apparel. The tactile stimulator 4 can be connected to any body part preferred by the controller. The body parts include hands, fingers, finger nails, wrists, forearms, arms, chests, pelvis, abdomen, torso front and back, scalps, ears, foreheads, necks, shoulders, legs, calves, feet, and toes. The body part may include any epithelial epidermal, ectodermal, mucsoal, mesothelial, mesodermal, endodermal and endothelial tissue. It will be appreciated that the tactile stimulator can be applied to any separate body component as per widely accepted anatomy text books such as *Gray's Anatomy: The Anatomical Basis of Clinical Practice,* 40th edition (2008), Churchill-Livingstone, Elsevier. ISBN 978-0-443-06684-9, for example.

In the embodiment of FIG. 1, data sent by the sensor 2 is sent to the transmitter 3 from where it is wirelessly sent to the controller of the UAV. It will be appreciated that any preferred communication means can be used to allow the output from the sensor 2 to the receiver 5. The receiver 5 of the embodiment of FIG. 1 includes a monitor device 6 configured to receive signals from the receiver 5 and process them according to predetermined consideration. A signal is sent from the receiver 4/monitor 6 to the tactile stimulator 4. The tactile stimulator is connected directly or indirectly to a body part of the controller and, as noted above, provides vibratory tactile stimulation corresponding to the magnitude of the sensed physical property in response to the receipt of a signal from the monitor 6.

Figure 4A:
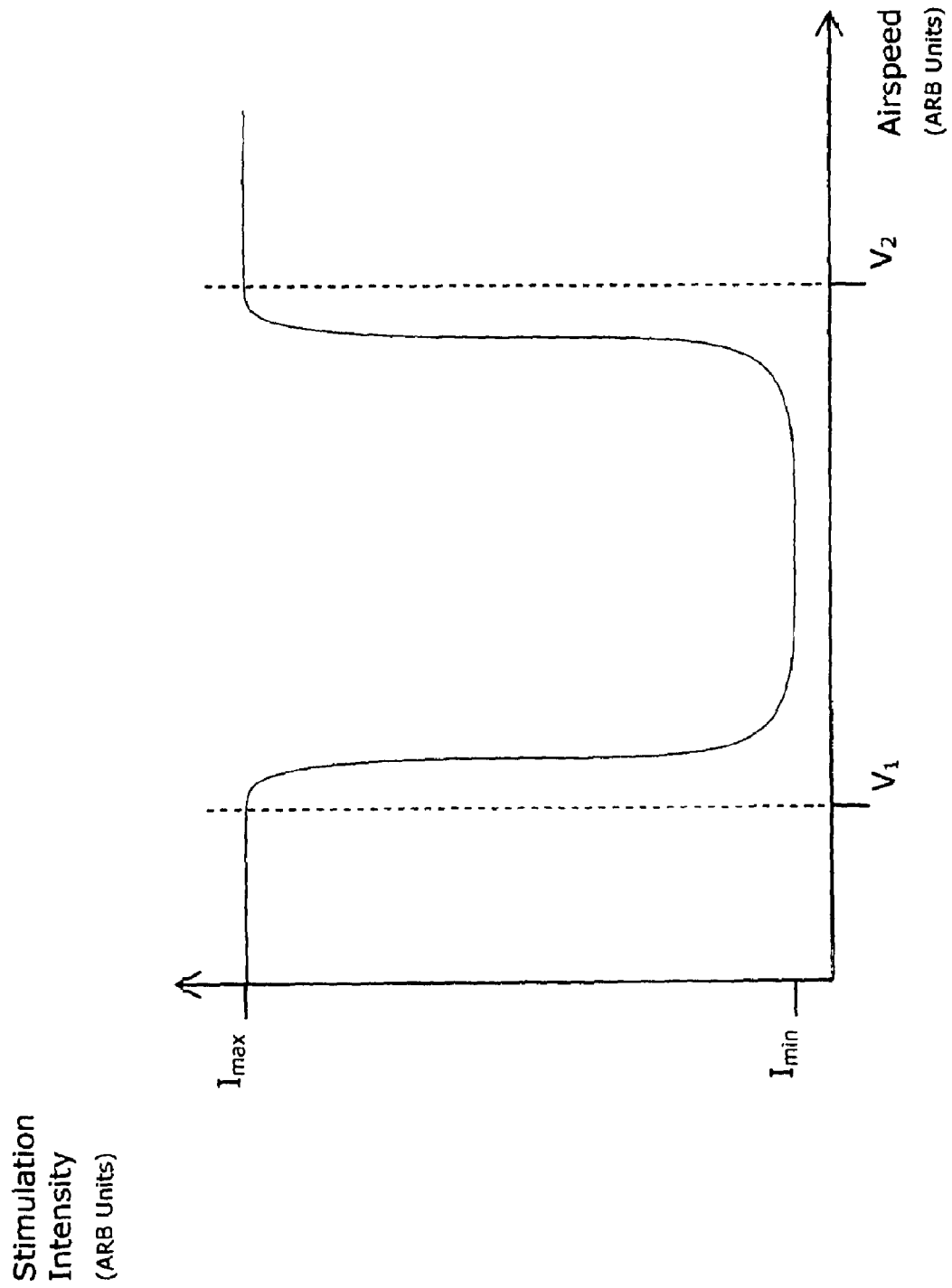
FIGS. 4A to 4C illustrate graphical representations of applied tactile stimulation of the system of FIG. 1 in response to a measured physical property.

The sensor 2 is configured to sense the air-speed or velocity of the UAV. FIG. 4A illustrates a graphical representation of the intensity (arbitrary units), or magnitude or amplitude, of stimulation applied by tactile stimulator 4 in response to sensor 2 measuring the UAV air speed. In FIG. 4A, velocity $V_1$ is intended to define a minimum velocity required to maintain lift on the UAV when airborne and $V_2$ is the maximum velocity that the UAV can safely travel at without disturbing any on-board equipment or structurally affecting the UAV and/or exceeding fuel consumption requirements. It can be seen that when the velocity is below the minimum air speed $V_1$, a maximum intensity tactile stimulation is delivered to the controller and the intensity diminishes until the velocity reaches (and preferably safely exceeds) the minimum velocity $V_1$. The stimulator then provides some minimum tactile stimulation to the controller, this may be no stimulation at all, until the UAV velocity drops toward or below $V_1$ or if it increases toward the maximum velocity $V_2$ where the intensity of applied stimulation is increased to a maximum value.

Figure 4B:
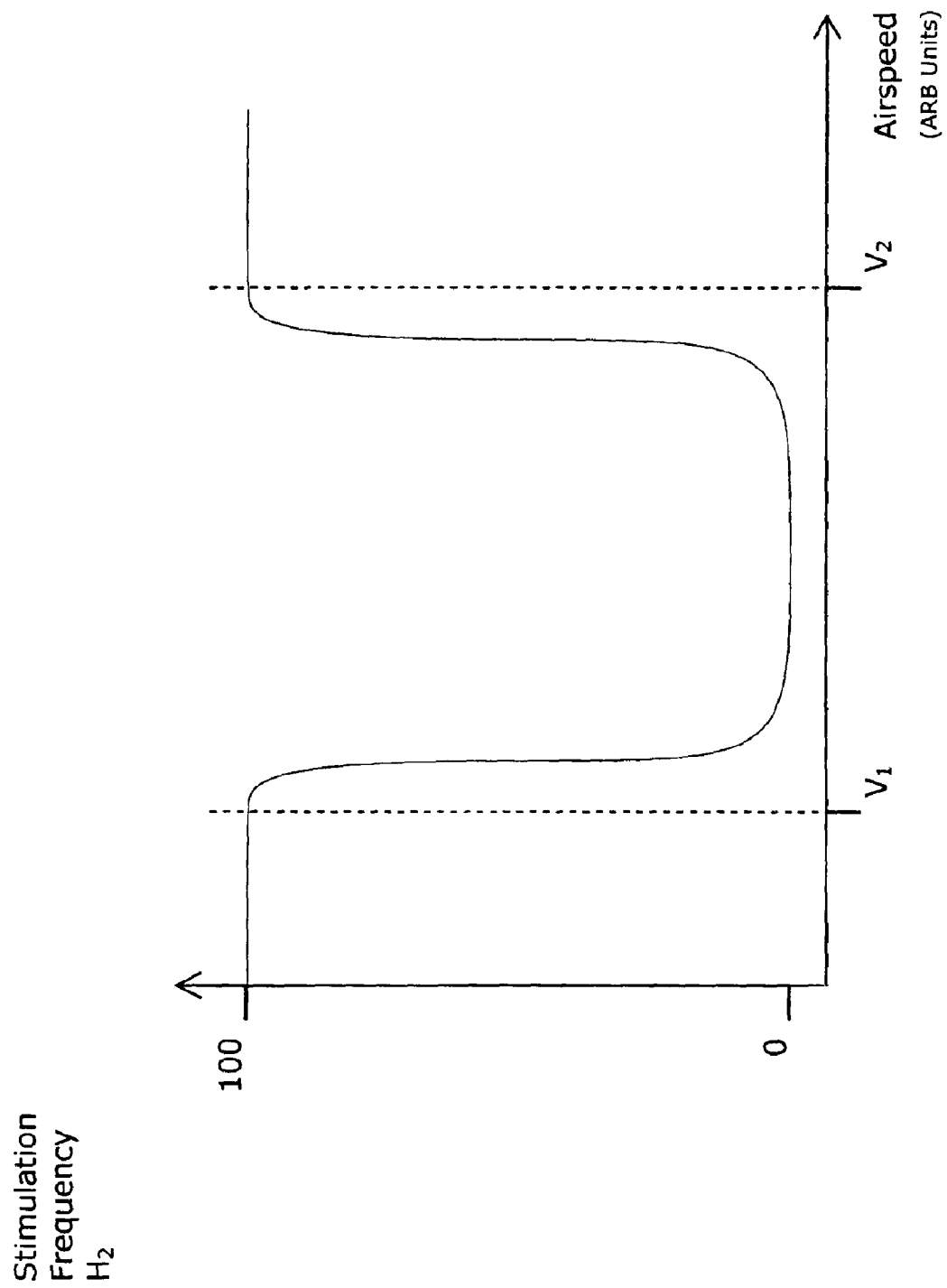

FIG. 4B illustrates a graphical representation of the frequency of the delivered tactile stimulation, for example at a constant intensity or varied in accordance with FIG. 4A, varies as a function of the UAV air speed, similarly to FIG. 4A. In this figure, it can be seen that the frequency of the stimulation is increased to some maximum value, 100 Hz in this embodiment, from some minimum value, being 0 Hz in this embodiment, as the velocity approaches or decreases below minimum velocity $V_1$. The frequency increases as the UAV velocity approaches maximum speed $V_2$ so that at maximum speed $V_2$ the frequency of applied tactile stimulation is maximum.

Figure 4C:
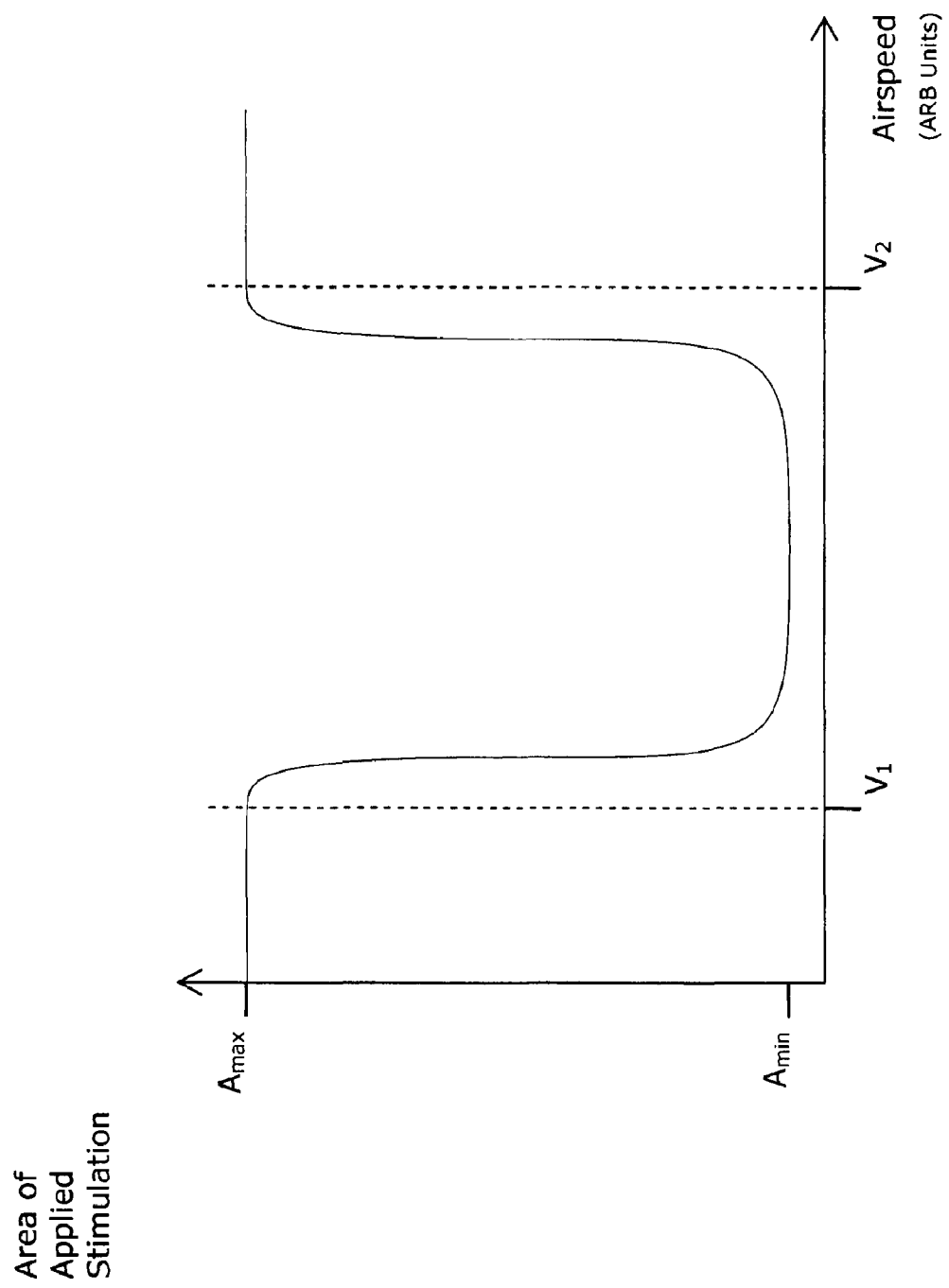

In an alternative embodiment to FIGS. 4A & B, FIG. 4C illustrates a graphical representation of the percentage of area of the tactile stimulator that actually provides tactile stimulation. As the UAV velocity is maintained between the minimum and maximum velocities, $V_1$ & $V_2$, the area over which tactile stimulation is applied to the controller via the tactile stimulator 4 is some minimum value which may be zero. As the velocity approaches and decreases below the minimum velocity, $V_1$, or increases towards and above the maximum velocity, $V_2$, the area of the tactile stimulator 4 applying tactile stimulation to the controller increases to some maximum value which may be substantially the entire surface area of the tactile stimulator 4.

It will be appreciated that the stimulation applied by the stimulator 4 can be a combination of that illustrated in FIGS. 4A, B &/or C so that the applied stimulation can vary in intensity &/or frequency &/or applied area &/or in the wave form the tactile stimulation is delivered in (eg, square or sine wave) in correspondence with the measured physical property. Furthermore, the stimulation applied by the stimulator 4 can vary from a single point to linear to elliptical or circular as described below with reference to FIG. 5. In the example of FIG. 4, as the UAV velocity approaches $V_1$, the intensity of the applied stimulation increases to some maximum value, $I_{max}$. In the preferred embodiment, the intensity &/or the frequency &/or applied area of stimulation reach a maximum on approach to $V_1$ or $V_2$ rather than when the UAV actually reaches those air speeds.

In this way, it will be appreciated that the controller of the UAV disposed remotely therefrom can be provided with stimulation so that the controller "feels" a physical condition such as UAV air speed. The controller can be made aware of this property by means of applied tactile stimulation without having to look at any instrumentation or other control data. The application of tactile stimulation appears to be an efficient method of removing additional distracting information thus minimising the amount of concentration required by the controller. It may be considered analogous to a rally car driver, for example, who 'feels' the coarseness and grip of each side of the car while consciously concentrating on road pitch, camber, speed changes, shaded surfaces and the placement of the other vehicles, for example. This is in addition to instrument monitoring such as engine heat, oil pressure as well as radio communications with a base.

This can be particularly advantageous when the controller's attention is diverted toward another aspect of their duty in control of the UAV such as targeting an enemy combatant and not noticing an undesirable change in air speed. Furthermore, the controller of the UAV can select the values of minimum and maximum air speeds, $V_1$ and $V_2$, for example, and the rate of change of intensity, frequency and/or area of applied stimulation in response to sensed UAV velocities approaching $V_1$ or $V_2$ from either direction.

It will also be appreciated that the sensor 2 can measure any preferred property of the UAV such as altitude, roll, pitch, yaw, wind speed, air pressure or air pressure changes, air temperature or air temperature changes, changes in altitude, changes in air speed, wind shear, experienced G-forces, upward convection currents, direction/heading and change in the direction or orientation of the UAV. The property can also include the UAV is being targeted, for example, by means of a radar or other device associated with the UAV, or can include changes in the topography or physical form of the surrounds of the remote vehicle. It can be seen that any property relevant to the operation of the UAV can be measured including operating properties of the UAV such as UAV engine fuel levels or pressures and the like.

Figure 5A:
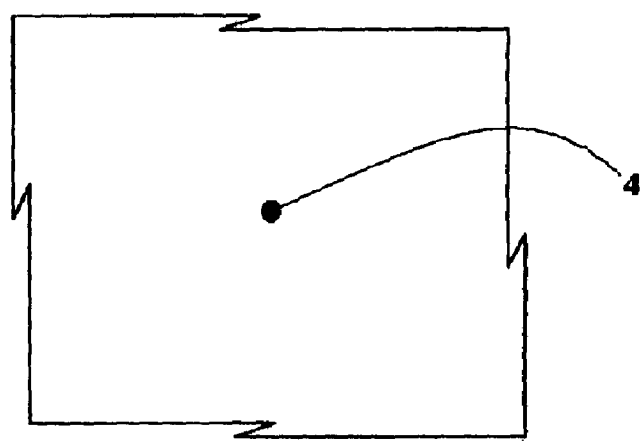
FIGS. 5A to 5Q illustrate schematic representations of different spatially applied tactile stimulation of the system of FIG. 1 in response to a measured physical property.
Figure 5B:
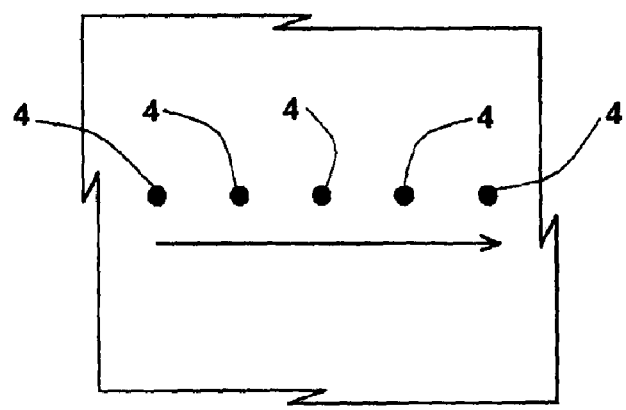
Figure 5C:
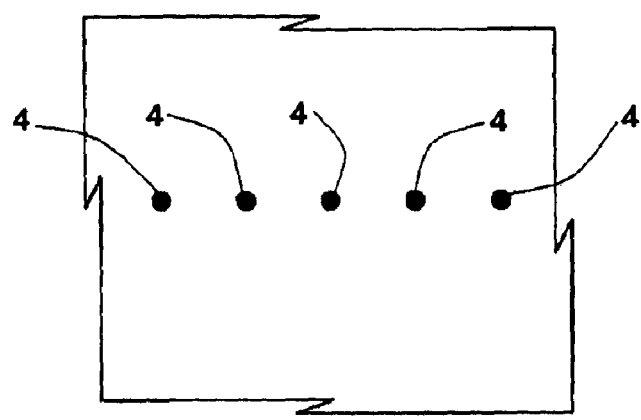
Figure 5D:
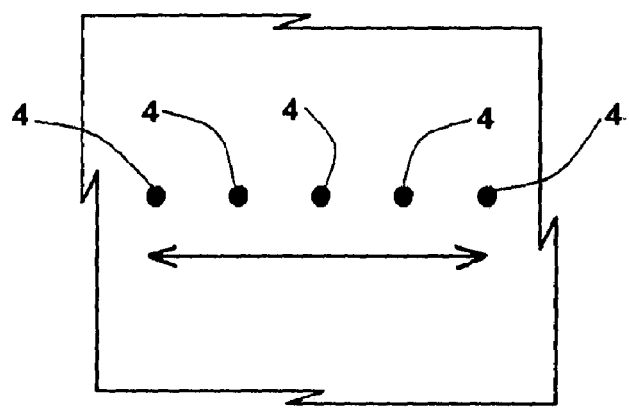
Figure 5E:
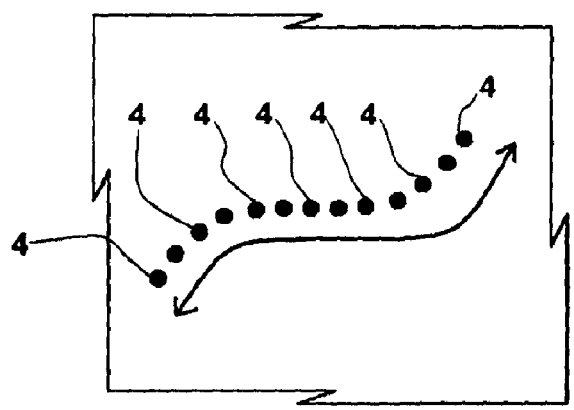
Figure 5F:
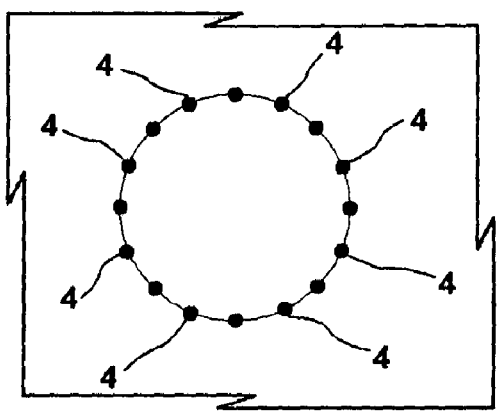
Figure 5G:
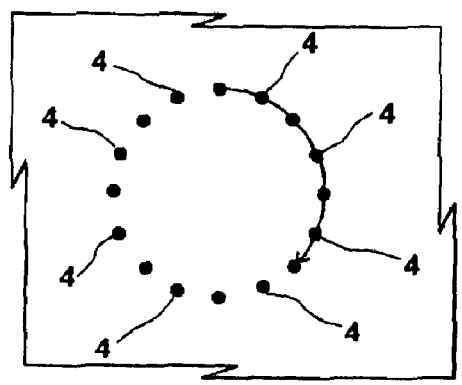
Figure 5H:
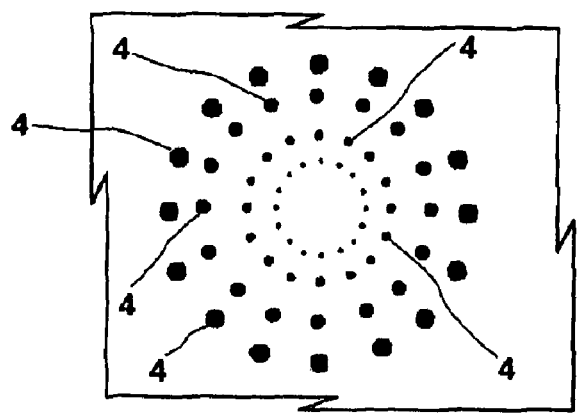
Figure 5I:
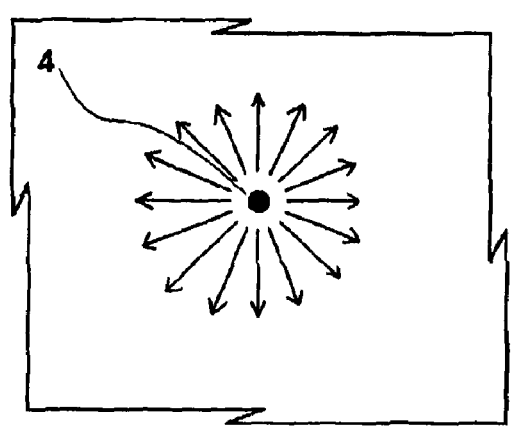
Figure 5J:
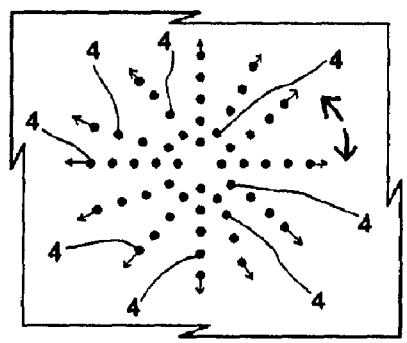
Figure 5K:
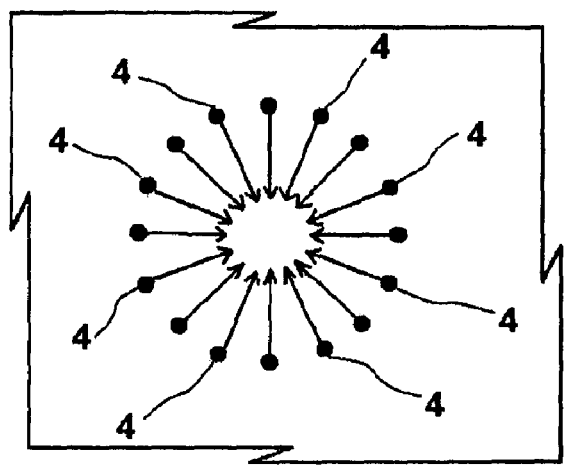
Figure 5L:
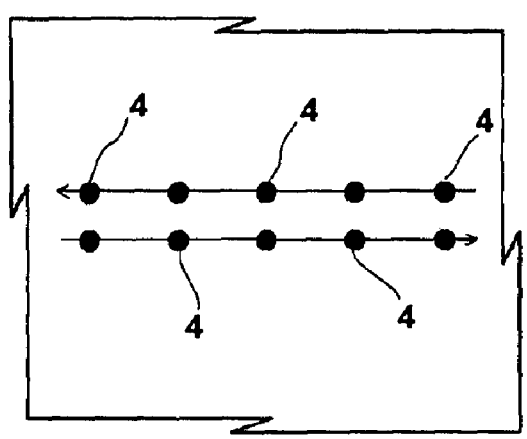
Figure 5M:
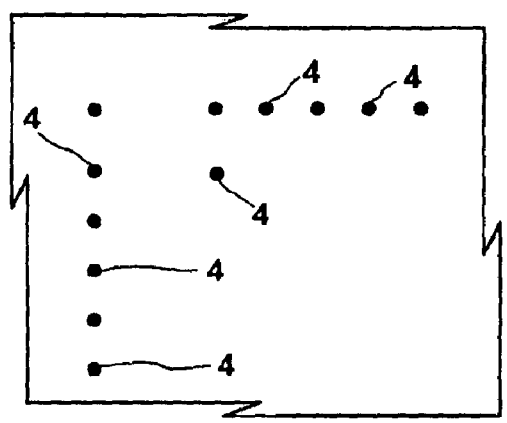
Figure 5N:
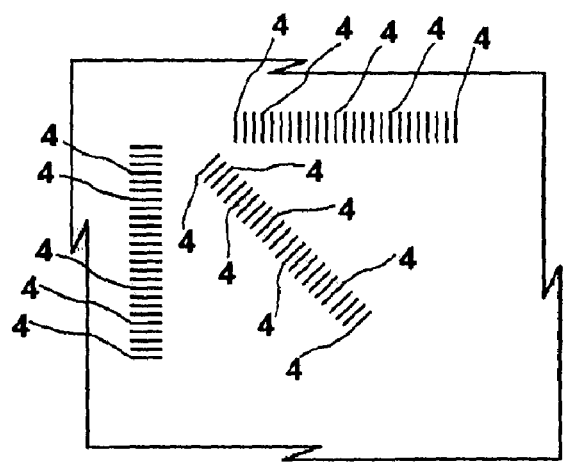
Figure 5O:
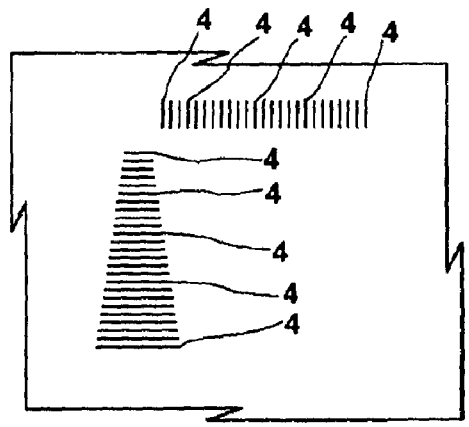
Figure 5P:
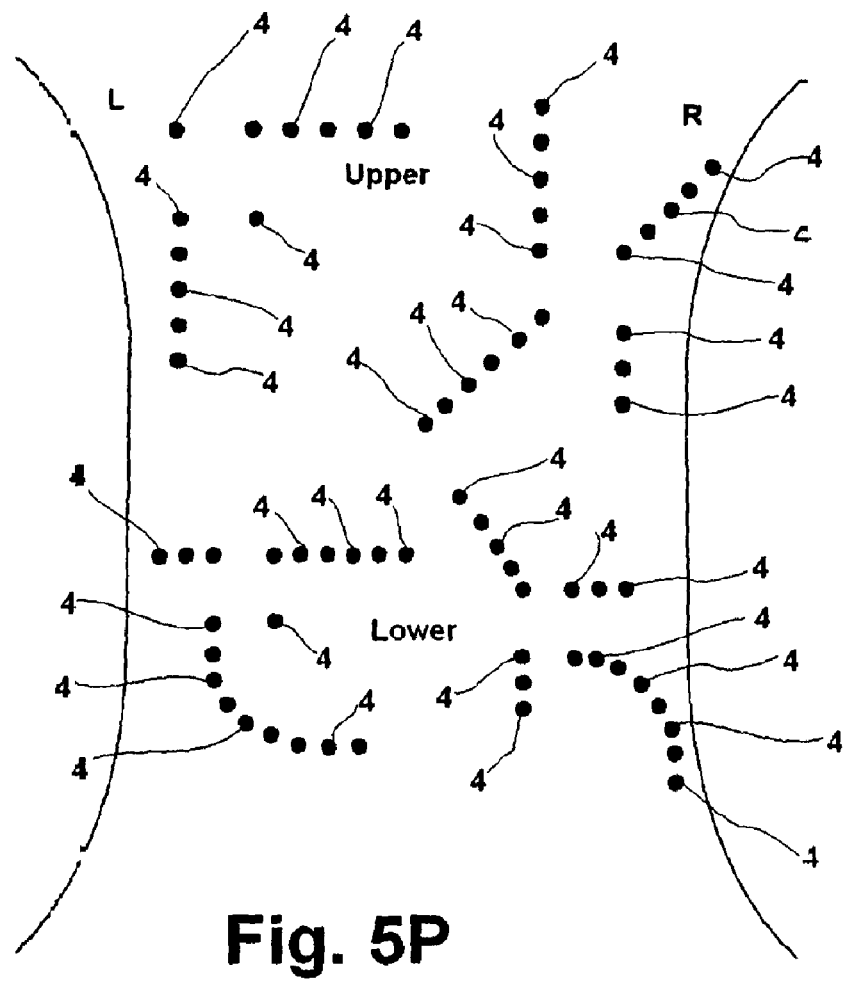
Figure 5Q:
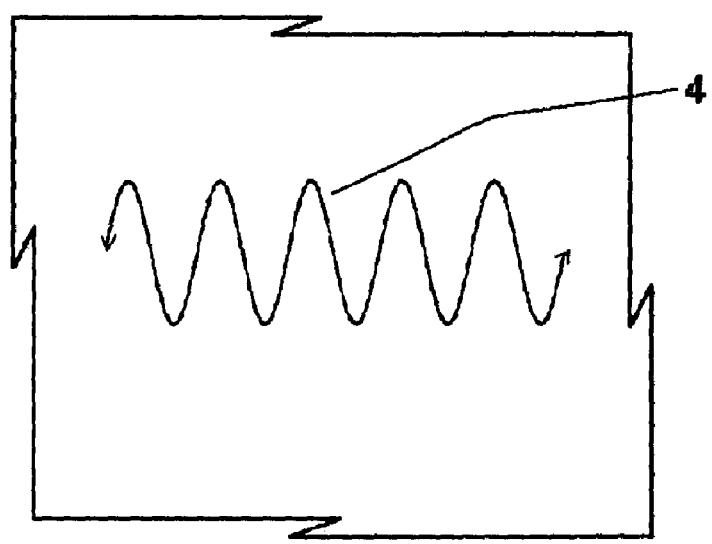

In FIGS. 5A to 5Q, there is illustrated various schematic representations of examples of tactile stimulation applied in different spatial orientations by the system 1 of FIG. 1 in response to a measured physical property. FIG. 5 each illustrate a stimulator 4 configured to be placed over a body part such as a chest of the controller of the UAV. On each stimulator 4 is illustrated how the stimulation is applied.

In FIG. 5A, a point or localised region 10 is placed in contact with the chest (in this example) and tactile stimulation can be applied thereby and vary in intensity or frequency as the measured physical property changes magnitude. FIG. 5B illustrates the case where five linearly arranged stimulators 4 can be actuated to provide tactile stimulation that forms a 'line'. The stimulation can be applied simultaneously by all three stimulators and vary in intensity for example in response to the measured property or the five stimulators can actuated sequentially from left to right as indicated by the arrow. For example, a first of the five stimulators can actuate and increase in intensity in response to the measured physical property until a maximum amplitude &/or frequency is achieved and then the second can actuate likewise and then the third, fourth then fifth stimulators can actuate.

FIG. 5C is similar to the embodiment of FIG. 5B except that the stimulators 4 can be actuated for right to left also and can be oriented to operate left to right and vice versa as illustrated or up and down and vice versa or at some angle therebetween. FIG. 5D is similar to FIG. 5C except where the stimulators 4 are actuated outwardly from the stimulator 4 in the centre in correspondence with a measured property. FIG. 5E illustrates a similar embodiment to FIG. 5D except that a curved line is formed from the stimulators 4. The stimulators 4 can be actuated simultaneously or outwardly from the centre stimulator 4 as desired. Of course, it will be appreciated that one half of the stimulators 4 may be actuated simultaneously and the other half actuated sequentially from the centre stimulator 4.

FIG. 5F is a schematic representation of circularly or elliptically applied stimulation. A circular array of stimulators 4 are disposed in direct or indirect contact with the chest of the remote controller of the UAV. Stimulation is applied by a plurality of simultaneously or sequentially actuated stimulators 4. The stimulation is varied in intensity and/or amplitude in correspondence with the magnitude of the sensed physical property. FIG. 5G is a schematic representation similar to the of FIG. 5F except that the circle is only formed when a maximum stimulation is to be applied. That is, the circle is formed with a proportion of the circle stimulated corresponding to a magnitude of the measured physical property so that when at some maximum, the full circle is stimulating. The amplitude or frequency of the stimulation may vary around the circle in correspondence with the physical property.

FIG. 5H is a schematic representation of a plurality of circular and concentrically arranged stimulators 4. In this embodiment, the stimulators may be actuated simultaneously where the intensity or frequency of applied stimulation is varied, or the concentric circles of stimulators 4 can be actuated one at a time starting with the innermost circle of stimulators 4, for example. Further, it will be appreciated that not only can the circles be sequentially actuated, the circles of actuators 4 can be actuated by actuating stimulators 4 in each circle sequentially.

In FIG. 5I, there is illustrated the embodiment where stimulation radiates from a point and either radiates further outwardly or stimulates with increased intensity in correspondence with the measured physical property. FIG. 5J is a schematic representation of applied stimulation in which a plurality of stimulators 4 form lines radially outwardly extending from a centre. The lines can be simultaneously actuated where each stimulator 4 in each line is sequentially actuated. The arrows indicate that the applied stimulation can rotated about the centre point in either direction in a manner equivalent to moving clock hands. The rate and/or direction of rotation can correspond to a measured property. FIG. 5K illustrates an example similar to FIG. 5I except that the stimulation radiates inwardly to a central point.

FIG. 5L, there is illustrated a schematic example of applied stimulation provided as a pair of parallel spaced-apart linear stimulators. Each linear stimulator in this example is formed from five stimulators 4 actuated in a linear order where the upper stimulators for a line moving left to right and the lower stimulators moving from right to left. The intensity &/or frequency of the applied stimulation can vary in correspondence with the measured physical property.

FIG. 5M illustrates an arrangement of stimulators 4 arranged to provide tactile stimulation vertically from a left hand line of stimulators 4. An upper line of stimulators 4 configured to provide a horizontal line of stimulation is spaced apart from the vertical line of stimulators. Each line is configured to provide stimulation in response to separate physical properties and each line can be actuated sequentially or all elements of the line at the same time. In this embodiment, a single point stimulator 4 is also provided and is spaced apart from the vertical and horizontal lines and is actuated in response to another physical property.

FIG. 5N is a schematic representation of three lines of stimulators 4. The lines can be actuated independently where each line corresponds to a different physical property. The length of stimulation of each line of stimulators 4 can be varied in correspondence with the respective measured properties. Likewise, the lines of stimulators 4 can be actuated each in response to the same property and the lines each increase in length at the same rate. Of course, the length of one or more lines may be constant and the intensity and/or frequency of the applied tactile stimulation can be varied.

FIG. 5O is similar to FIG. 5N except that only a vertical and horizontal line of stimulators 4 are provided and the width of the vertical line of stimulators 4 increases with length.

Turning now to FIG. 5P, there is illustrated a schematic representation of the back of a controller of a remote UAV. In this embodiment, a plurality of stimulators 4 are provided. The stimulators are segmented to upper left and right and lower left and right portions. The upper left hand portion includes stimulators 4 as described with reference to FIG. 5M where a horizontal line, a vertical line and a point formed from tactile stimulators 4 where the point and the lines are actuated in response to different measured properties. The upper right hand portion of this embodiment includes four discreet line segments formed from stimulators 4. The lower portions are formed from stimulators 4 as illustrated and each straight or curved line segment and the point (lower left portion) are actuated each in response to a difference measured property if desired.

In this way, it will be appreciated that complex stimulation can be applied to the controller of the UAV. The stimulation can, for example, move over the skin surface as well as vary in intensity and the arrangement allows significant information about many properties to be provided to the controller via the tactile stimulators 4.

FIG. 5Q illustrates an example of a stimulator configured to provide a sinusoidal or wavy stimulation pattern. The stimulation is varied in intensity or frequency or temporally or varying in sequence, and the wavelength and amplitude of the sinusoid may also vary in correspondence with the measured property as desired.

Figure 2:
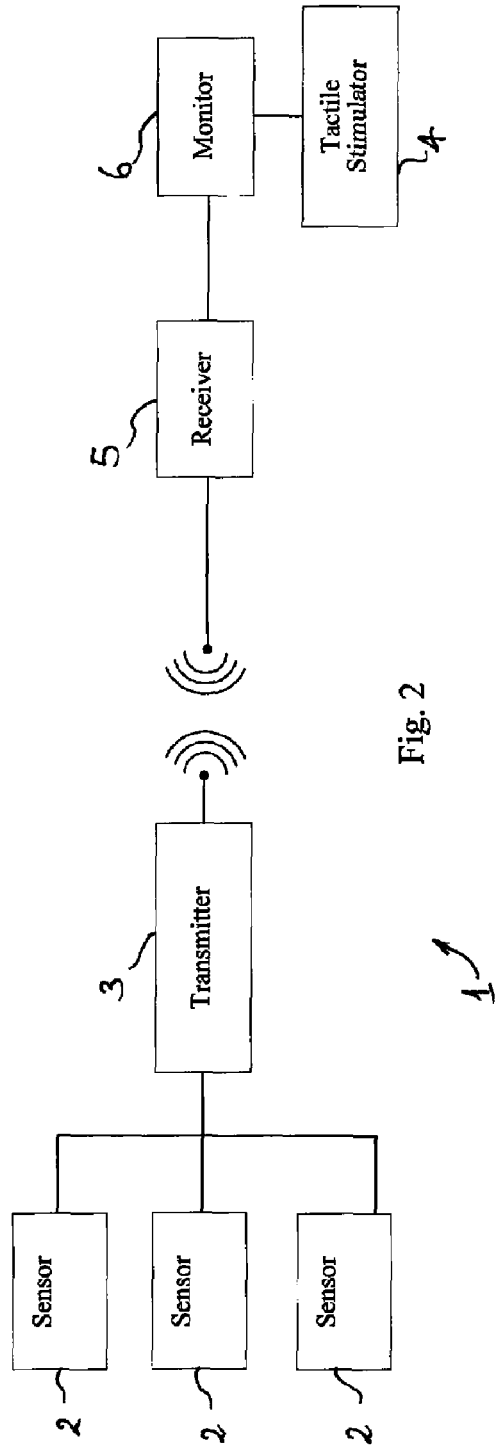
FIG. 2 is a schematic representation of the system for applying tactile stimulation according to a second embodiment.

Referring now to FIG. 2 there is illustrated an embodiment similar to that of FIG. 1 except that the system 1 for applying tactile stimulation includes a plurality of sensors 2. The sensors are configured to detect and measure the velocity of the UAV, its altitude and experienced G-forces. This embodiment operates similarly to that of FIG. 1 except that multiple sensors are used to measure a plurality of physical properties, velocity, altitude and G-forces in the embodiment of FIG. 2, and this data is transmitted to the receiver 5 and then receiver monitor 6 for processing. It will be appreciated that any type or number of physical properties can sensed as desired.

A single tactile stimulator 4 is connected to a body part of the controller directly or indirectly through clothing. The tactile stimulator is configured to provide tactile stimulation to the controller if any one of the three sensed properties falls outside a predetermined range. The system 1 can also be configured such that the tactile stimulator 4 provides tactile stimulation having a different frequency depending on which sensed property causes the stimulation. Furthermore, it will be appreciated that the tactile stimulator 4 can be configured to be segmented across three areas such that stimulation applied by one area corresponds to one of the sensors falling outside a predetermined range or changing at a rate greater than a predetermined rate such as too slow or excessive speed &/or G-forces &/or UAV altitude or a rate of change of one or more of the measured physical properties.

The system 1 of the embodiment of FIG. 2 also advantageously allows more complicated stimulation to be provided to the controller of the UAV. For example, the provision of tactile stimulation in response to the velocity falling below the minimum velocity $V_1$ described in FIG. 4A will only trigger the application of tactile stimulation to the controller if the altitude of the UAV is above ground level (ie airborne) which is when such a drop in speed is critical to be known by the controller. FIGS. 5A to 5C illustrate graphical representations of the delivery of tactile stimulation in response to signals received from sensors 2 individually and/or in combination.

Figure 3:
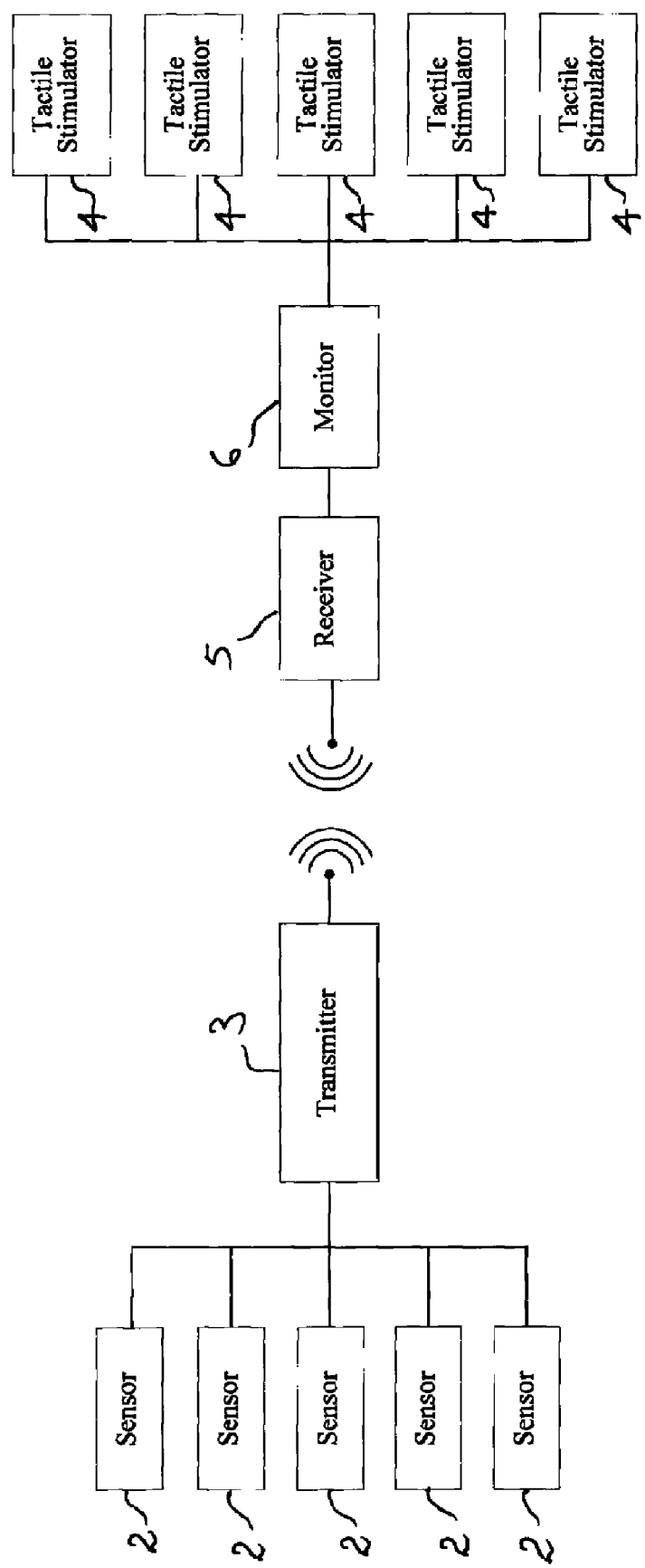
FIG. 3 is a schematic representation of the system for applying tactile stimulation according to a third embodiment.

Referring now to FIG. 3, there is illustrated an embodiment of the system 1 similar to that of FIG. 2 except that multiple tactile stimulators 4 are provided. The multiple tactile stimulators 4 can be provided to a single controller of a UAV or can be separately applied to different controllers of the UAV as desired. That is, one tactile stimulator 4 can be provided for tactile stimulation to the controller in response to the output of one sensor 2 or a combination of one or more sensors 4. Furthermore, the tactile stimulators 4 can provide tactile stimulation if the sensors 2 measure physical properties outside of a predetermined range or if there are changes at a rate greater than a predetermined rate. Also, it will be appreciated that, although not illustrated, the remote controller can have a plurality of tactile stimulators 4 where a first stimulator 4 provides tactile stimulation in response to one or more measured physical properties and a second and subsequent stimulator 4 applies tactile stimulation once the measured physical property approaches or falls outside predetermined values or a range.

It will also be appreciated that in other embodiments of the invention (not illustrated) a tactile stimulator 4 may be disposed on a front and rear of a body part (such as a limb or torso) or person and the tactile stimulation delivered from the front to the back or vice versa. For example, one stimulator 4 may be disposed on a controller's chest and another stimulator 4 disposed on their back. Of course, a single segmented stimulator can be provided where one segment corresponds to a front and the other segment to a rear. Similarly, the stimulator may be disposed on left and right hand potions of a body part or person. This can employ multiple stimulation devices if desired so that a body symmetry of stimulation locations can be related or in correspondence with vehicle symmetry including up/down in addition to front/rear and left/right.

Figure 6:
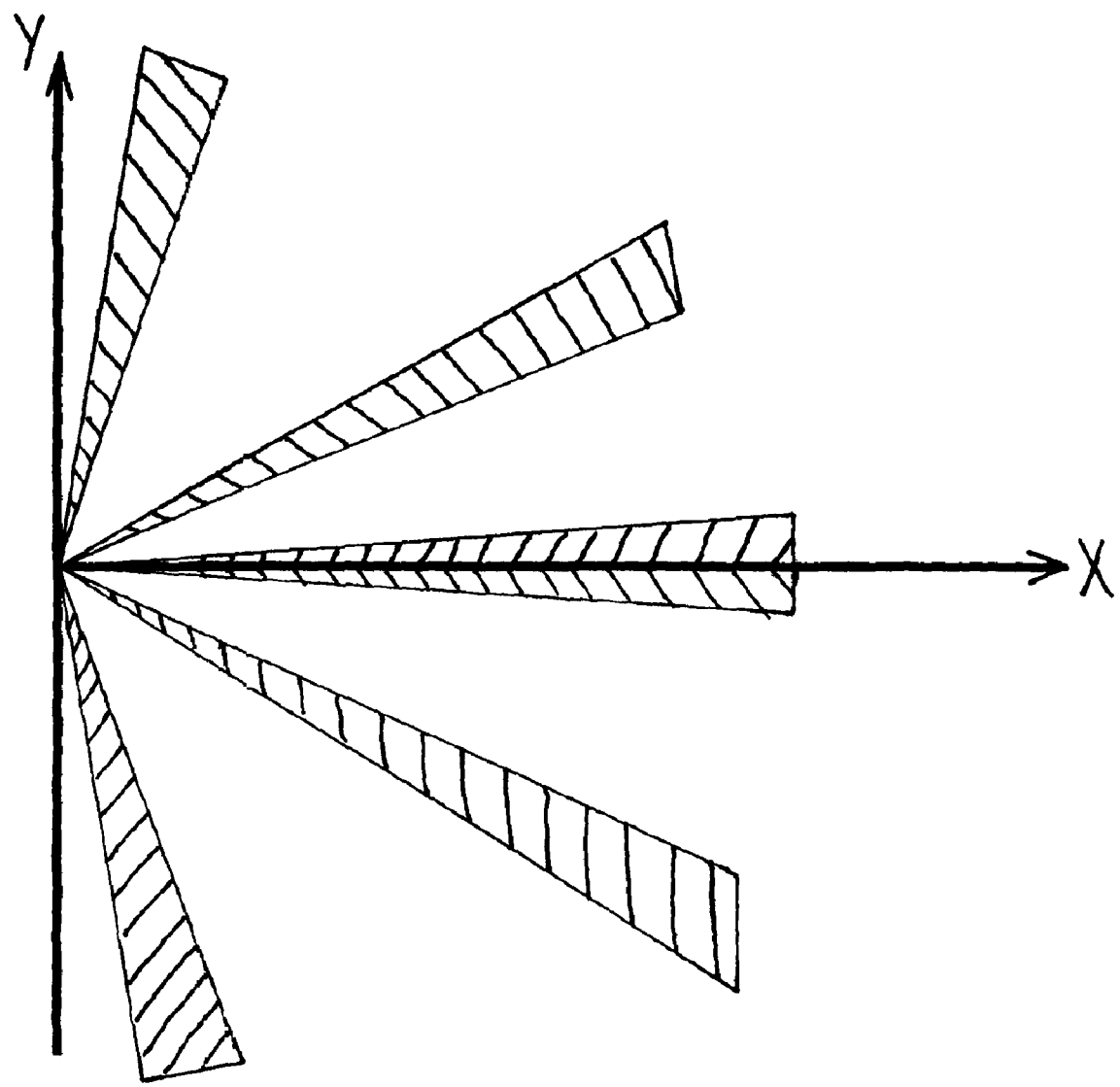
FIG. 6 illustrates a schematic representation of another type of applied tactile stimulation of the system of FIG. 1 in response to a measured physical property.

Referring to FIG. 6, there is illustrated a schematic graphical representation of another type of applied tactile stimulation of the system of FIG. 1. FIG. 6 illustrates the tactile stimulation applied over, for example, the chest of the controller of a UAV in response to the measured lift up-draught on the right-hand wing of the UAV. The angular direction of the stimulation corresponds to the direction of up-draught or lift. If below the X-axis, then the right hand wing is experiencing negative lift or down-draught and if above the X-axis, experiencing lift or up-draught. If the stimulation runs along the X-axis, the net lift or up-draught is zero.

The length of the tactile stimulation can increase in proportion to the magnitude of the lift or can increase in amplitude, frequency or spatial area. Similarly, the rotation of the applied stimulation could correspond to the magnitude of the lift or up-draught. Although not illustrated, it will be appreciated that tactile stimulation corresponding to the lift of the left-hand wing can be provided on a separate stimulator or on the left hand (negative side of the Y-axis) of the stimulator illustrated in FIG. 6.

Furthermore, it will be understood that tactile stimulation analogous to a clock hand or dial in motion may be provided in correspondence to measured torque direction, or rotation of the UAV, for example. The rate or frequency of the clock-hand motion and/or length and/or thickness of the hand can be varied in correspondence to the magnitude of or a change in a measured physical property.

In respect of the X & Y axes of FIG. 6, it will be appreciated that these can be oriented on the UAV controller in any preferred orientation. For example, the Y-axis may correspond in alignment to sagital or para-sagital plane of the controller and the X-axis may correspond to a transverse plane of the controller. The Y-axis can be aligned with the coronal plane of the controller if disposed or curved around the ribs. It will be appreciated that any other alignment can be provided as preferred such as along an oblique or transverse plane. In the embodiment of FIG. 6, the X-axis is configured to correspond to the horizon of the UAV.

Figure 7:
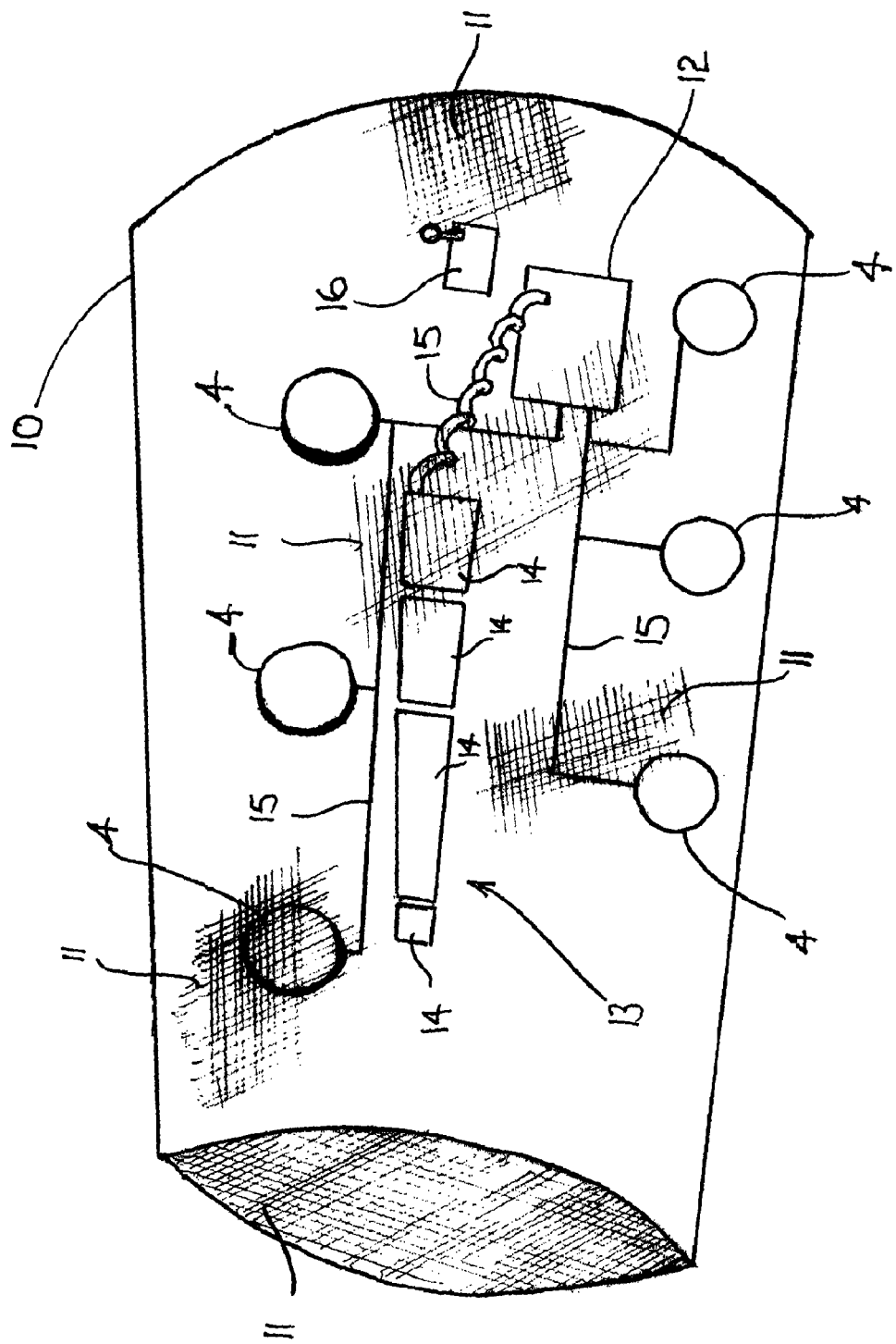
FIG. 7 is an isometric view of a plurality of tactile stimulators of the system of FIG. 3.

Referring now to FIG. 7, there is illustrated an isometric representation of a forearm sleeve 10 having a plurality of stimulators as part of the system 1 of FIG. 3. The sleeve 10 is formed from an elastic or stretchable mesh-type material 11 (illustrated in part in FIG. 7) to be worn over a forearm (not illustrated). Six tactile stimulators 4 are disposed on an inside of the sleeve 10 for direct or in direct contact with the skin of the forearm. Each point stimulator 4 is configured to deliver tactile stimulation in response to a respective sensed physical property and change applied tactile intensity, for example, in correspondence with the measured property.

The stimulators 4 are controlled by a controller 12. A strip stimulator 13 formed from four tactile stimulation segments 14 is disposed on the inside of the sleeve 10 and provides linearly applied tactile stimulation. The length of the applied stimulation from one to all four segments 14 corresponds to the magnitude of the sensed physical property. The controller 12 also controls the stimulator 13 and is in communication therewith by means of an electrical connection 15 disposed within the sleeve 10. A battery 16 provides the necessary power. Communication between the controller 11 and a receiver 5 and/or monitor 6 (not illustrated in FIG. 7) can be any preferred cable or wireless means. It will be appreciated that the receiver 5 and/or monitor 6 can be integrally formed with the sleeve 10 or remote therefrom.

Figure 8:
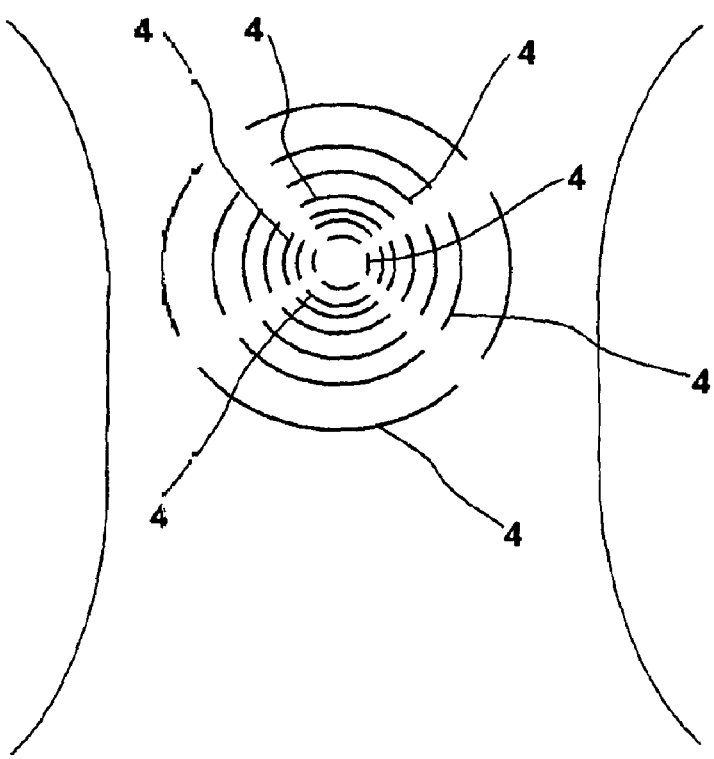
FIG. 8 is a schematic representation of tactile stimulation of the system of FIG. 3 applied to the back of a controller.

Turning to FIG. 8, there is illustrated a schematic representation of tactile stimulators applied to the back of the controller of the UAV in the system 1 FIG. 3. In this embodiment, four stimulator circle segments are formed from a plurality stimulators 4.

Each segment can be actuated to provide stimulation in response to four different properties, or the segments can be actuated in pairs each responsive to different properties, or all actuated simultaneously in response to one single property or to one or a plurality of properties. The radius or length of each segment can be constant and the intensity or frequency, for example, of the applied tactile stimulation varied or kept constant. Of course, such an arrangement of stimulators 4 could also be disposed on the front of a controller and where stimulation is applied to the front either simultaneously as with the back or in response to one or more different properties.

Figure 9:
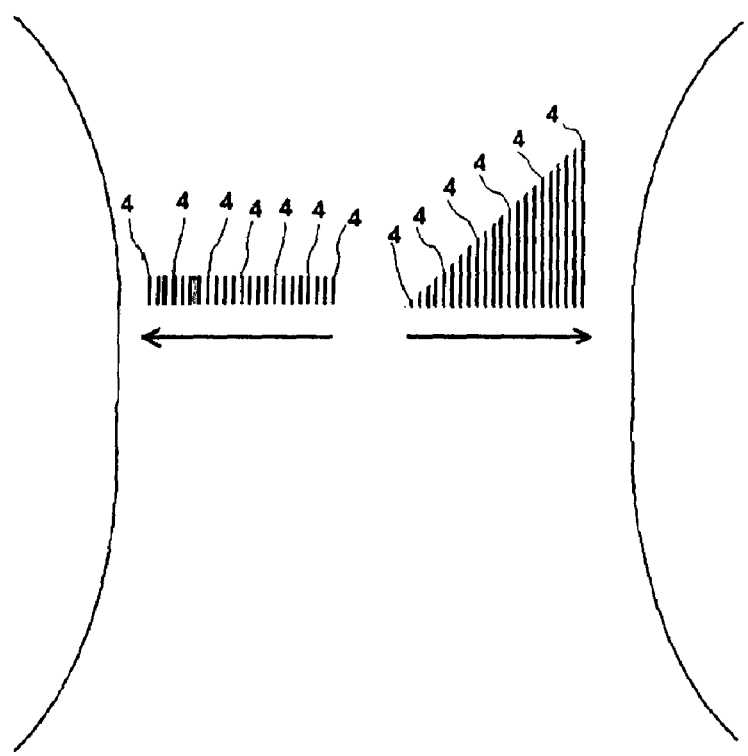
FIG. 9 is a schematic representation of alternative tactile stimulation of the system of FIG. 3 applied to the back of a controller.

In FIG. 9, there is illustrated an alternative embodiment of a schematic representation of tactile stimulators applied to the back of the controller of the UAV in the system 1 FIG. 3. In this embodiment, a pair of lines of stimulation are formed from a plurality of stimulators 4. The left hand line is configured to either provide a constant or variable line length of stimulation and vary, for example, stimulation intensity or frequency in response to a measured property. The arrow underneath the left hand line indicates the direction of increasing stimulation (line length).

Likewise, the right hand line is similar to the left hand line in that it can provide an increase in stimulation length with or without any variation in intensity. The right hand line additionally can be configured to increase in width with increasing line length of stimulation. The arrow underneath the right hand line indicates increasing line length of stimulation. It will be appreciated that the left and right hand stimulation lines can correspond to different properties or the same properties.

Although the preferred embodiments relate to UAVs, it will be appreciated that in other preferred embodiments the vehicle is a remote controlled terrestrial, sub-terrestrial, marine or submarine vehicle, whether unmanned or manned vehicles. For example, although not illustrated, the remote vehicle may be used in mining or aquaculture and can be a manned or unmanned vehicle. The remote vehicle may be a car, truck, train (for example an iron ore or coal train), tram, bus, forklift, blimp, bomb disposal robot, or robotic arm or any other remote vehicle. The sensed physical property can include signals from tunnels, crossing overpasses, height sensors, weather, vehicle obstruction, radiation or environmental pollutants or proximity. It will also be appreciated that any preferred physical property can be measured or sensed.

It will also be appreciated that one or more tactile stimulators 4 can be brought into direct or indirect contact with a mesothelial, mesodermal, endothelial and endodermal surface in preferred embodiments depending on considerations such as the sterile placement of the stimulator(s) and use of inert materials. For example, tactile stimulation may be applied to joint proprioceptors.

It will be further appreciated that the delivery of tactile stimulation, for example, corresponding to the magnitude of the sensed physical property may include direction measurements, for example, where the magnitude of the delivered stimulation is proportional to the extent the measured direction is away from a preferred direction.

The foregoing describes only some embodiments of the present invention and modifications, obvious to those skilled in the art, can be made thereto without departing from the scope of the present invention.

The term "comprising" (and its grammatical variations) as used herein is used in the inclusive sense of "including" or "having" and not in the exclusive sense of "consisting only of".

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system for applying tactile stimulation to a controller of a remote vehicle, the system comprising:
   a sensor disposed on the remote vehicle and configured to measure a physical property of the remote vehicle and generate output data indicative thereof;
   a transmitter associated with the remote vehicle and in communication with the sensor to receive the output data, the transmitter configured to send the output data to the controller at a remote location; and
   a tactile stimulator configured to be placed in direct or indirect contact with a skin or epidermal surface of the controller of the remote vehicle to whom an output of the tactile stimulation is to be provided, the tactile stimulator in communication with the output of the sensor to deliver tactile stimulation corresponding to a magnitude of the sensed physical property such that the tactile stimulator operates independently of a direct control mechanism disposed on the remote vehicle operated by the controller to operate the remote vehicle.

2. A system according to claim 1 wherein the output of the sensor is converted into data communicable to the controller of the remote vehicle after being interpreted and/or manipulated on the remote vehicle or at the remote location of the controller.

3. A system according to claim 1 including a receiver disposed on the remote vehicle to provide communication from the controller to the remote vehicle.

4. A system according to claim 1 wherein the tactile stimulation applied to the remote vehicle controller is in the form of hot or cold sensations, electrical stimulation or vibration stimulation.

5. A system according to claim 1 wherein the tactile alarm is connected to a body part of the controller of the remote vehicle.

6. A system according to claim 5 wherein the body part is selected from the group consisting of hand, finger, finger nail, wrist, forearm, arm, chest, pelvis, abdomen, torso front and back, scalp, ear, forehead, neck, shoulder, leg, calf, foot, and toe.

7. A system according to claim 5 wherein the body part is selected from the group consisting of epithelial epidermal, ectodermal, mucsoal, mesothelial, mesodermal, endodermal and endothelial tissue.

8. A system according to claim 1 comprising a plurality of sensors each configured to measure a different physical property of the remote vehicle and each generate output data indicative thereof.

9. A system according to claim 8 wherein the measured physical property of the remote vehicle by the sensors include altitude, air speed, roll, pitch, yaw, wind speed, changes in altitude, changes in air speed, wind shear, experienced G forces, and direction or orientation or changes thereto.

10. A system according to claim 1 wherein the remote vehicle is a manned or an unmanned remote aerial vehicle, a remote land vehicle, or a remote marine vehicle.

11. A system according to claim 1 including a plurality of tactile stimulators each configured to be placed in contact with the skin surface of the controller of the remote vehicle, each tactile stimulator configured to provide tactile stimulation to the controller of the remote vehicle in response to a corresponding sensed physical property of the remote vehicle.

12. A system according to claim 1 wherein tactile stimulation is applied to the controller of the remote vehicle in response to one or more of the sensed physical properties falling outside a predetermined range or changing at a rate that is outside a predetermined range.

13. A system according to claim 1 wherein the tactile stimulator is configured to provide tactile stimulation corresponding in intensity, magnitude, amplitude, frequency and/or spatial location with the magnitude of the measured physical property.

14. A system for applying tactile stimulation to a human controller of a remote vehicle, the system comprising:
   a sensor disposed on the remote vehicle and configured to measure a physical property of the remote vehicle and generate output data indicative thereof;
   a transmitter associated with the remote vehicle and in communication with the sensor to receive the output data, the transmitter configured to send the output data to the human controller at a remote location; and
   a tactile stimulator configured to be placed in direct or indirect contact with a skin or epidermal surface of the human controller of the remote vehicle to whom an output of the tactile stimulation is to be provided, the tactile stimulator in communication with the output of the sensor to deliver tactile stimulation corresponding to a magnitude of the sensed physical property, wherein the tactile stimulator is characterized in that it delivers tactile stimulation to the skin of the human controller and characterized by the absence of control signals from the tactile stimulator to control the remote vehicle;

wherein the tactile stimulator is coupled directly to a body part of the human controller such that the human controller receives tactile stimulation from the transmitter independent of whether the human controller is actively engaged in controlling the remote vehicle.

15. The system according to claim 14 wherein the body part is selected from the group consisting of forearm, arm, chest, pelvis, abdomen, torso front and back, scalp, ear, forehead, neck, shoulder, leg, calf, foot, and toe.

16. The system according to claim 14 wherein tactile stimulator is coupled to both the chest and the back of the human controller.

* * * * *